US009698642B1

(12) United States Patent
Goessling et al.

(10) Patent No.: US 9,698,642 B1
(45) Date of Patent: Jul. 4, 2017

(54) MOTOR WITH MULTI-PHASE WINDINGS AND SERIES-STACKED INVERTER

(71) Applicant: X Development LLC, Mountain View, CA (US)

(72) Inventors: Andrew David Goessling, Mountain View, CA (US); George E. Homsy, II, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 28 days.

(21) Appl. No.: 14/843,668

(22) Filed: Sep. 2, 2015

(51) Int. Cl.
  *F03D 9/00* (2016.01)
  *H02P 9/04* (2006.01)
  *H02K 11/00* (2016.01)
  *H02K 3/28* (2006.01)

(52) U.S. Cl.
  CPC .............. *H02K 3/28* (2013.01); *F03D 9/002* (2013.01); *H02K 11/0073* (2013.01)

(58) Field of Classification Search
  USPC ........................................ 290/44, 55; 310/71
  See application file for complete search history.

(56) References Cited

U.S. PATENT DOCUMENTS

| 1,912,207 | A | * | 5/1933 | Keniedy | H02K 17/08 318/442 |
| 4,631,456 | A | * | 12/1986 | Drescher | H02K 7/025 310/113 |
| 6,064,172 | A | * | 5/2000 | Kuznetsov | G01R 31/346 318/434 |
| 7,116,029 | B2 | * | 10/2006 | Kerlin | H02K 3/18 310/166 |
| 8,330,308 | B2 | * | 12/2012 | Denny | H02K 3/28 310/179 |
| 8,362,671 | B2 | * | 1/2013 | Taniguchi | H02K 29/03 310/216.091 |
| 8,598,725 | B1 | * | 12/2013 | Himmelmann | F03D 9/003 290/44 |
| 9,151,272 | B2 | * | 10/2015 | Goessling | F03D 9/002 |
| 9,156,565 | B2 | * | 10/2015 | Hachtmann | B64F 1/12 |
| 9,212,032 | B2 | * | 12/2015 | Vander Lind | B21C 23/00 |
| 9,212,033 | B2 | * | 12/2015 | Vander Lind | B21C 23/00 |
| 9,248,910 | B1 | * | 2/2016 | Vander Lind | B64F 1/36 |

(Continued)

FOREIGN PATENT DOCUMENTS

JP          5085408 B2     11/2009

*Primary Examiner* — Pedro J Cuevas
(74) *Attorney, Agent, or Firm* — McDonnell Boehnen Hulbert & Berghoff LLP

(57) ABSTRACT

In one aspect, a system is described. The system may include a rotor, a plurality of magnets positioned adjacent to the rotor, and a stator defining a plurality of sections. Each of the plurality of sections of the stator may include a plurality of teeth. The system may also include a plurality of winding wires wound around the plurality of teeth of each of the plurality of sections of the stator. The plurality of winding wires wound around the plurality of teeth may define a plurality of single-phase sub-motors. The plurality of single-phase sub-motors have a magnetic design such that at least one of the plurality of single-phase sub-motors are rotationally offset from an adjacent single-phase sub-motor, which may improve motor performance and voltage isolation. The system may also include a plurality of inverters coupled to the plurality of winding wires.

15 Claims, 9 Drawing Sheets

(56) References Cited

U.S. PATENT DOCUMENTS

| | | | | |
|---|---|---|---|---|
| 9,308,975 B2* | 4/2016 | Vander Lind | ......... | B64C 39/022 |
| 9,327,845 B2* | 5/2016 | Vander Lind | ......... | B64C 39/022 |
| 9,353,033 B2* | 5/2016 | Vander Lind | .......... | F03D 9/002 |
| 9,422,918 B2* | 8/2016 | Lind | .................... | F03D 7/0204 |
| 9,429,141 B2* | 8/2016 | Vander Lind | ......... | F03D 7/0204 |
| 9,458,829 B2* | 10/2016 | Hallamasek | ............ | F03D 13/20 |
| 2005/0189828 A1* | 9/2005 | Nakayama | ........... | B62D 5/0403 |
| | | | | 310/71 |
| 2006/0012259 A1* | 1/2006 | Kerlin | ...................... | H02K 3/18 |
| | | | | 310/166 |
| 2006/0091755 A1* | 5/2006 | Carlisle | ............... | H02K 19/103 |
| | | | | 310/168 |
| 2010/0221112 A1* | 9/2010 | Bevirt | ....................... | F03D 5/00 |
| | | | | 416/135 |
| 2010/0295320 A1* | 11/2010 | Bevirt | ................... | B64C 39/022 |
| | | | | 290/55 |
| 2011/0042965 A1* | 2/2011 | Atallah | ............... | H02K 49/102 |
| | | | | 290/1 C |
| 2011/0057453 A1* | 3/2011 | Roberts | .................... | F03D 1/02 |
| | | | | 290/55 |
| 2011/0089778 A1* | 4/2011 | Denny | ..................... | H02K 3/28 |
| | | | | 310/71 |
| 2013/0328317 A1* | 12/2013 | Himmelmann | ......... | F03D 9/003 |
| | | | | 290/55 |
| 2014/0361122 A1* | 12/2014 | Ruiterkamp | .............. | F03D 5/00 |
| | | | | 244/154 |
| 2015/0008856 A1* | 1/2015 | Yoo | ....................... | H02M 7/487 |
| | | | | 318/400.26 |
| 2015/0183516 A1* | 7/2015 | Vander Lind | ......... | B64C 39/022 |
| | | | | 244/155 R |
| 2015/0183527 A1* | 7/2015 | Hachtmann | ............... | B64F 1/12 |
| | | | | 244/110 E |
| 2015/0183617 A1* | 7/2015 | Vander Lind | .......... | B21C 23/00 |
| | | | | 244/154 |
| 2015/0184629 A1* | 7/2015 | Vander Lind | .......... | F03D 9/002 |
| | | | | 416/131 |
| 2015/0184633 A1* | 7/2015 | Lind | .................... | F03D 7/0204 |
| | | | | 290/44 |
| 2015/0184637 A1* | 7/2015 | Vander Lind | ......... | F03D 7/0204 |
| | | | | 290/44 |
| 2015/0184638 A1* | 7/2015 | Vander Lind | ........... | B21C 23/00 |
| | | | | 242/601 |
| 2015/0184639 A1* | 7/2015 | Goessling | ............... | F03D 9/002 |
| | | | | 290/44 |
| 2015/0214798 A1* | 7/2015 | Tajima | ................... | H02K 21/16 |
| | | | | 310/156.19 |
| 2015/0232200 A1* | 8/2015 | Vander Lind | ............. | B64F 1/12 |
| | | | | 244/110 C |
| 2015/0252788 A1* | 9/2015 | Vander Lind | ........... | F03D 11/00 |
| | | | | 416/95 |
| 2015/0275861 A1* | 10/2015 | Goldstein | ............... | F03D 9/002 |
| | | | | 290/44 |
| 2015/0298806 A1* | 10/2015 | Vander Lind | ........... | F03D 9/002 |
| | | | | 518/704 |
| 2015/0330368 A1* | 11/2015 | Goldstein | ................. | F03D 1/02 |
| | | | | 290/44 |
| 2015/0354539 A1* | 12/2015 | Goessling | ............... | F03D 9/002 |
| | | | | 290/44 |
| 2015/0375847 A1* | 12/2015 | Kinne | ....................... | F03D 5/00 |
| | | | | 244/48 |
| 2015/0375852 A1* | 12/2015 | Hallamasek | ............ | F03D 13/20 |
| | | | | 244/175 |
| 2016/0002013 A1* | 1/2016 | Hachtmann | ............. | F03D 13/20 |
| | | | | 254/266 |
| 2016/0010627 A1* | 1/2016 | Austin | ...................... | F03D 3/02 |
| | | | | 290/55 |
| 2016/0061186 A1* | 3/2016 | Vander Lind | ............. | F03D 5/00 |
| | | | | 416/85 |
| 2016/0102654 A1* | 4/2016 | GilroySmith | ............ | F03D 9/003 |
| | | | | 244/1 TD |
| 2016/0264260 A1* | 9/2016 | Hachtmann | ............. | F03D 9/005 |
| 2016/0273519 A1* | 9/2016 | Vander Lind | ............ | F03D 9/002 |
| 2016/0318628 A1* | 11/2016 | Vander Lind | ......... | B64C 39/022 |
| 2016/0336884 A1* | 11/2016 | Matsuoka | ................ | H02P 6/10 |

* cited by examiner

MOTOR WITH MULTI-PHASE WINDINGS AND SERIES-STACKED INVERTER

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

SUMMARY

In one aspect, a system is provided. The system may include a rotor, a plurality of magnets positioned adjacent to the rotor, and a stator defining a plurality of sections. Each of the plurality of sections of the stator may include a plurality of teeth. The system may also include a plurality of winding wires wound around the plurality of teeth of each of the plurality of sections of the stator. The plurality of winding wires wound around the plurality of teeth may define a plurality of single-phase sub-motors, where at least one of the plurality of single-phase sub-motors is rotationally offset from an adjacent single-phase sub-motor. The system may also include a plurality of inverters coupled to the plurality of winding wires.

In another respect, an aerial wind turbine is provided. The aerial wind turbine may include a ground station, an aerial vehicle, a rotor/stator assembly, a propeller, and an electrically conductive tether. The rotor/stator assembly may include a rotor, a rotor shaft, a plurality of magnets positioned adjacent to the rotor, a stator defining a plurality of sections, a plurality of winding wires wound around the plurality of teeth of each of the plurality of sections of the stator, and a plurality of inverters coupled to the plurality of winding wires. Each of the plurality of sections of the stator may include a plurality of teeth. The stator may be disposed coaxial to the rotor, and the rotor may be configured to rotate relative to the stator. The plurality of winding wires wound around the plurality of teeth may define a plurality of single-phase sub-motors, where at least one of the plurality of single-phase sub-motors is rotationally offset from an adjacent single-phase sub-motor. The propeller may be coupled to the rotor shaft. In addition, the electrically conductive tether may be coupled to the stator and to the ground station.

In yet another respect, another system is provided. The system may include a motor system comprising (i) a rotor, (ii) a plurality of magnets positioned adjacent to the rotor, (iii) a stator defining a plurality of sections, where each of the plurality of sections of the stator include a plurality of teeth, (iv) a plurality of winding wires wound around the plurality of teeth of each of the plurality of sections of the stator, where the plurality of winding wires wound around the plurality of teeth define a plurality of single-phase sub-motors, and where at least one of the plurality of single-phase sub-motors is rotationally offset from an adjacent single-phase sub-motor, and (v) a plurality of inverters coupled to the plurality of winding wires. The system may also include a control system comprising a plurality of controllers. A given controller of the plurality of controllers may be coupled to each of the plurality of single-phase sub-motors such that each of the plurality of controllers may be configured to individually control a given sub-motor of the plurality of sub-motors.

These as well as other aspects, advantages, and alternatives, will become apparent to those of ordinary skill in the art by reading the following detailed description, with reference where appropriate to the accompanying drawings.

DETAILED DESCRIPTION

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed methods and systems and can be arranged and combined in a wide variety of different configurations, all of which are contemplated herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

Example embodiments may relate to systems for use as motors and/or generators. Such motors and/or generators may be used in a wind energy system, such as an aerial wind turbine (AWT) system, although the embodiments described herein are not limited to such systems. As used herein, the terms motor and generator may each refer to a motor, a generator, or a combination motor/generator.

By way of background, an AWT may include an aerial vehicle that flies in a path, such as a substantially circular path, to convert kinetic wind energy to electrical energy. In an example embodiment, the aerial vehicle may be connected to a ground station via an electrically conductive tether. While tethered, the aerial vehicle may: (i) fly at a range of elevations and substantially along the path, and return to the ground, and (ii) transmit electrical energy to the ground station via the tether. In some embodiments, the ground station may transmit electricity via the tether to the aerial vehicle for take-off and/or landing.

In some applications, such as, for example, AWT applications, it may be desirable for a motor to achieve a high operating voltage. For example, higher voltage is favorable in AWT applications when power is transmitted over long distances, as loss is proportional to the square of current. The use of high voltage direct current (DC) in motor drive applications requires the use of high voltage power devices, which are expensive and inefficient compared to lower voltage devices. This means as the voltages go up, the cooling requirements do as well and the inverter must switch at lower frequencies, which may require heavy filters. Therefore, it is difficult to create a light and efficient high voltage motor and inverter using this approach. Therefore, it may be advantageous to create a motor that operates with higher voltage while utilizing lower voltage devices.

Figure 1:
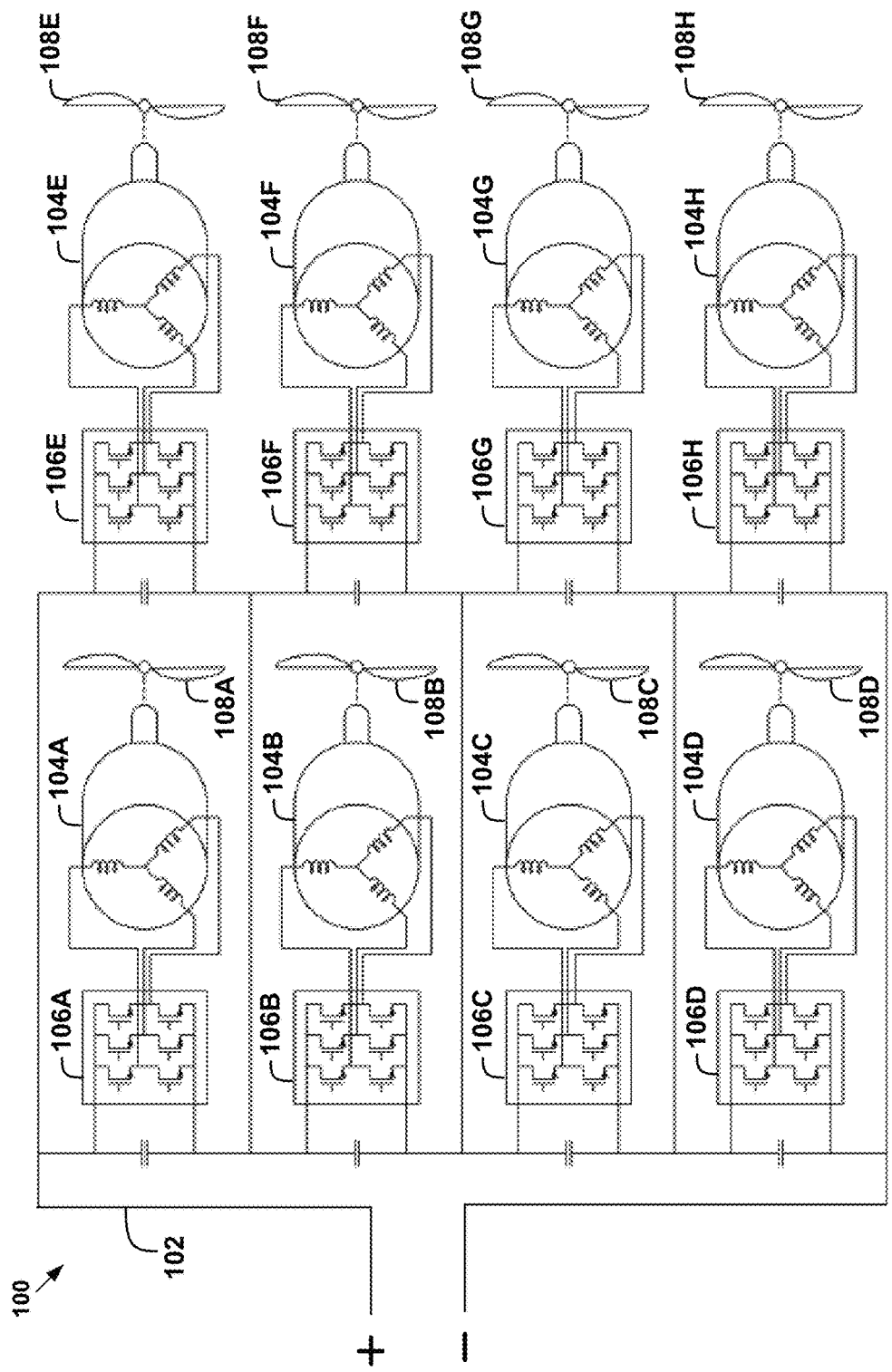
FIG. 1 illustrates a stacked motor system, according to an example embodiment.

FIG. 1 illustrates a medium-voltage motor system 100 using low voltage motors and inverters. The motor system 100 may be designed for use in an aerial vehicle of an AWT, for example. As shown, the motor system 100 includes a four series by two parallel stack of motors 104A-104H coupled respectively to inverters 106A-106H dispersed across the entire airframe. Each of the motors 104A-104H is coupled to a propeller 108A-108H. Each of the inverters 106A-106H may be connected to a tether 102 which includes electrical conductors. The tether 102 may in turn connect the AWT to a ground station (not shown). The motors 104A-104H may be 850V 85 kW three-phase motors, although other examples are possible as well.

Figure 2:
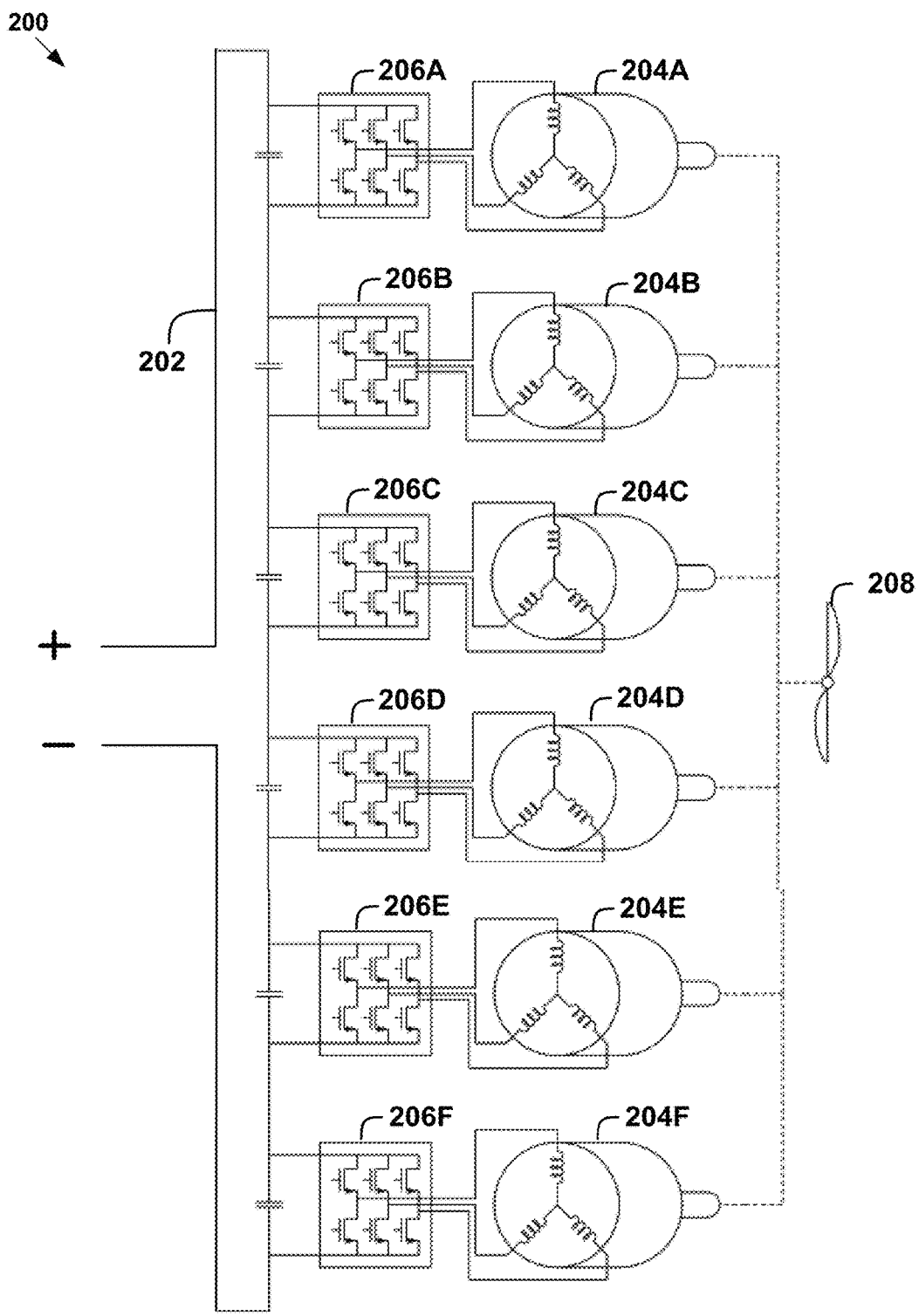
FIG. 2 illustrates another stacked motor system, according to an example embodiment.

FIG. 2 illustrates another motor/inverter system in which multiple motors and inverters are connected to a single propeller. As shown in FIG. 2, a motor system 200 may include six three-phase motors 204A-204F and six inverters 206A-206F that are coupled to or on the same shaft with the electronics series stacked to develop a medium-voltage system from low voltage motors and inverters. The motors 204A-204F may be 750V 15 kW three-phase motors, although other examples are possible as well. Further, six motors 204A-204F are shown in FIG. 2, but other numbers of motors are possible as well. The example configuration shown would provide a 4.5 kV electrical potential in the tether. In the example 750V system, this configuration has the advantage of being able to remove, or short circuit, one level and still be operational at 900V per motor/inverter. If a second level is removed, the worst case voltage stress across the remaining levels would be 1125V, which may be below the typical absolute maximum peak voltage of 1200V for a 750V 15 kW motor/inverter. However, a three-phase motor design (such as the design shown in FIG. 2) would require six switches per inverter, and all six switches would be required to switch at the PWM frequency, which is a higher frequency than the electrical commutation frequency of the motor. It is desirable to reduce the number of PWM frequency switches because that will reduce cost and complexity of the motor system. A single phase motor/inverter system is described below with respect to FIG. 6 which provides such a benefit. In such a configuration, the six three-phase motors need not be in separate cases, as depicted in FIG. 2, but may be sector-shaped segments in the same package. As such, each sector-shape segment may represent a sub-motor of the system.

It should be understood that the above examples are provided for illustrative purposes, and should not be construed as limiting. As such, the method may additionally or alternatively include other features or include fewer features, without departing from the scope of the invention.

II. EXAMPLE SYSTEMS

A. Example Airborne Wind Turbine (AWT)

Figure 3:
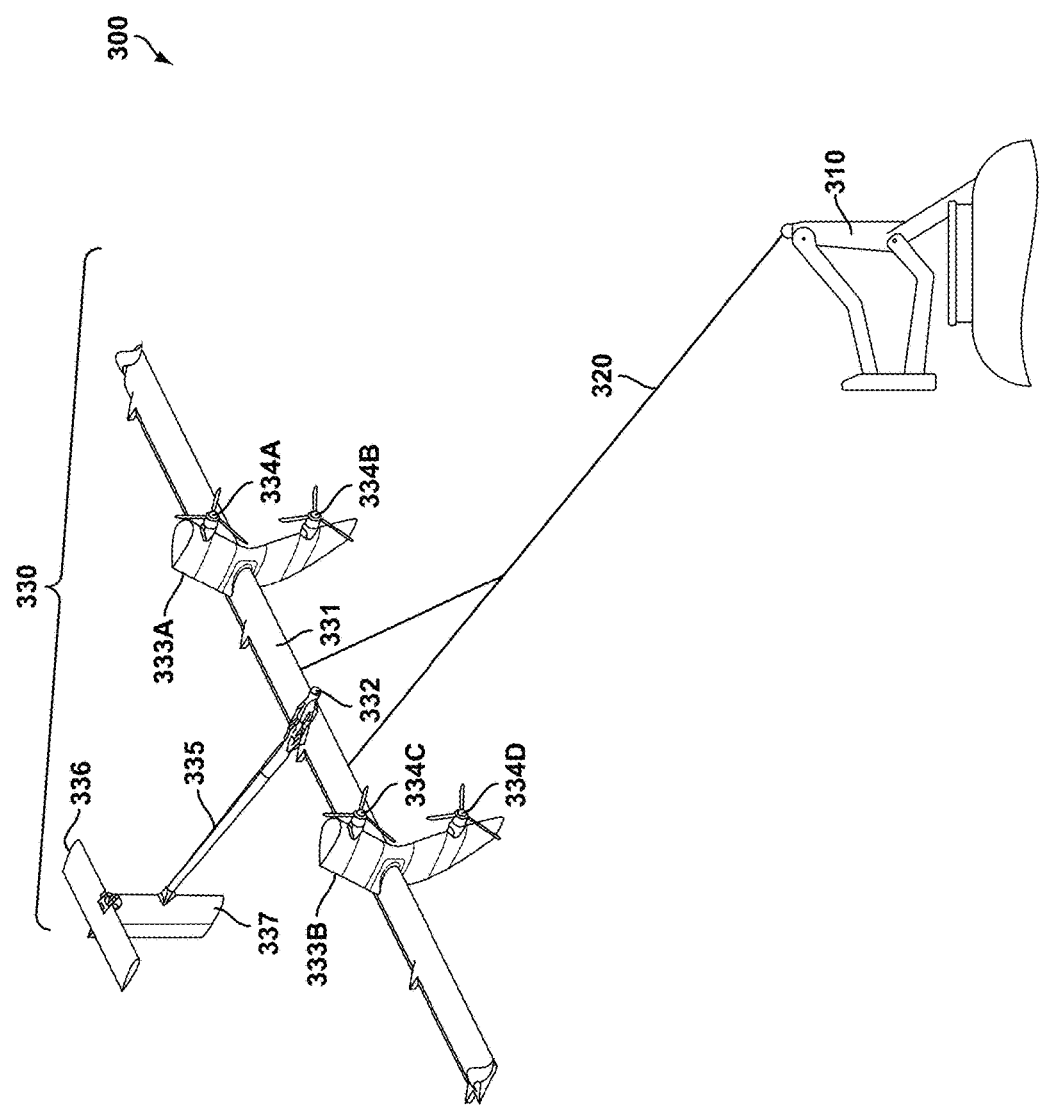
FIG. 3 depicts an Airborne Wind Turbine (AWT), according to an example embodiment.

FIG. 3 depicts an AWT 300, according to an example embodiment. In particular, the AWT 300 includes a ground station 310, a tether 320, and an aerial vehicle 330. As shown in FIG. 3, the aerial vehicle 330 may be connected to the tether 320, and the tether 320 may be connected to the ground station 310. In this example, the tether 320 may be attached to the ground station 310 at one location on the ground station 310, and attached to the aerial vehicle 330 at two locations on the aerial vehicle 330. However, in other examples, the tether 320 may be attached at multiple locations to any part of the ground station 310 and/or the aerial vehicle 330.

The ground station 310 may be used to hold and/or support the aerial vehicle 330 until it is in an operational mode. The ground station 310 may also be configured to allow for the repositioning of the aerial vehicle 330 such that deploying of the device is possible. Further, the ground station 310 may be further configured to receive the aerial vehicle 330 during a landing. The ground station 310 may be formed of any material that can suitably keep the aerial vehicle 330 attached and/or anchored to the ground while in hover flight, forward flight, crosswind flight.

In addition, the ground station 310 may include one or more components (not shown), such as a winch, that may vary a length of the tether 320. For example, when the aerial vehicle 330 is deployed, the one or more components may be configured to pay out and/or reel out the tether 320. In some implementations, the one or more components may be configured to pay out and/or reel out the tether 320 to a predetermined length. As examples, the predetermined length could be equal to or less than a maximum length of the tether 320. Further, when the aerial vehicle 330 lands in the ground station 310, the one or more components may be configured to reel in the tether 320.

The tether 320 may transmit electrical energy generated by the aerial vehicle 330 to the ground station 310. In addition, the tether 320 may transmit electricity to the aerial vehicle 330 in order to power the aerial vehicle 330 for takeoff, landing, hover flight, and/or forward flight. The tether 320 may be constructed in any form and using any material which may allow for the transmission, delivery, and/or harnessing of electrical energy generated by the aerial vehicle 330 and/or transmission of electricity to the aerial vehicle 330. The tether 320 may also be configured to withstand one or more forces of the aerial vehicle 330 when the aerial vehicle 330 is in an operational mode. For example, the tether 320 may include a core configured to withstand one or more forces of the aerial vehicle 330 when the aerial vehicle 330 is in hover flight, forward flight, and/or crosswind flight. The core may be constructed of any high strength fibers. In some examples, the tether 320 may have a fixed length and/or a variable length. For instance, in at least one such example, the tether 320 may have a length of 340 meters.

The aerial vehicle 330 may be configured to fly substantially along a path to generate electrical energy. The term "substantially along," as used in this disclosure, refers to exactly along and/or one or more deviations from exactly along that do not significantly impact generation of electrical energy as described herein and/or transitioning an aerial vehicle between certain flight modes as described herein.

The aerial vehicle 330 may include or take the form of various types of devices, such as a kite, a helicopter, a wing and/or an airplane, among other possibilities. The aerial vehicle 330 may be formed of solid structures of metal, plastic and/or other polymers. The aerial vehicle 330 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

As shown in FIG. 3, the aerial vehicle 330 may include a main wing 331, a front section 332, rotor connectors 333A-B, rotors 334A-D, a tail boom 335, a tail wing 336, and a vertical stabilizer 337. Any of these components may be shaped in any form which allows for the use of components of lift to resist gravity and/or move the aerial vehicle 330 forward.

The main wing 331 may provide a primary lift for the aerial vehicle 330. The main wing 331 may be one or more rigid or flexible airfoils, and may include various control surfaces, such as winglets, flaps, rudders, elevators, etc. The control surfaces may be used to stabilize the aerial vehicle 330 and/or reduce drag on the aerial vehicle 330 during hover flight, forward flight, and/or crosswind flight.

The main wing 331 may be any suitable material for the aerial vehicle 330 to engage in hover flight, forward flight, and/or crosswind flight. For example, the main wing 331 may include carbon fiber and/or e-glass. Moreover, the main wing 331 may have a variety dimensions. For example, the main wing 331 may have one or more dimensions that correspond with a conventional wind turbine blade. As another example, the main wing 331 may have a span of 8 meters, an area of 4 meters squared, and an aspect ratio of 15. The front section 332 may include one or more components, such as a nose, to reduce drag on the aerial vehicle 330 during flight.

The rotor connectors 333A-B may connect the rotors 334A-D to the main wing 331. In some examples, the rotor connectors 333A-B may take the form of or be similar in form to one or more pylons. In this example, the rotor connectors 333A-B are arranged such that the rotors 334A-D are spaced between the main wing 331. In some examples, a vertical spacing between corresponding rotors (e.g., rotor 334A and rotor 334B or rotor 334C and rotor 334D) may be 0.9 meters.

The rotors 334A-D may configured to drive one or more generators for the purpose of generating electrical energy. In this example, the rotors 334A-D may each include one or more blades, such as three blades. The one or more rotor blades may rotate via interactions with the wind and which could be used to drive the one or more generators. In addition, the rotors 334A-D may also be configured to provide a thrust to the aerial vehicle 330 during flight. With this arrangement, the rotors 334A-D may function as one or more propulsion units, such as a propeller. Although the rotors 334A-D are depicted as four rotors in this example, in other examples the aerial vehicle 330 may include any number of rotors, such as less than four rotors or more than four rotors.

The tail boom 335 may connect the main wing 331 to the tail wing 336. The tail boom 335 may have a variety of dimensions. For example, the tail boom 335 may have a length of 2 meters. Moreover, in some implementations, the tail boom 335 could take the form of a body and/or fuselage of the aerial vehicle 330. And in such implementations, the tail boom 335 may carry a payload.

The tail wing 336 and/or the vertical stabilizer 337 may be used to stabilize the aerial vehicle and/or reduce drag on the aerial vehicle 330 during hover flight, forward flight, and/or crosswind flight. For example, the tail wing 336 and/or the vertical stabilizer 337 may be used to maintain a pitch of the aerial vehicle 330 during hover flight, forward flight, and/or crosswind flight. In this example, the vertical stabilizer 337 is attached to the tail boom 335, and the tail wing 336 is located on top of the vertical stabilizer 337. The tail wing 336 may have a variety of dimensions. For example, the tail wing 336 may have a length of 2 meters. Moreover, in some examples, the tail wing 336 may have a surface area of 0.45 meters squared. Further, in some examples, the tail wing 336 may be located 1 meter above a center of mass of the aerial vehicle 330.

While the aerial vehicle 330 has been described above, it should be understood that the methods and systems described herein could involve any suitable aerial vehicle that is connected to a tether, such as the tether 320.

B. Example Components of an AWT

Figure 4:
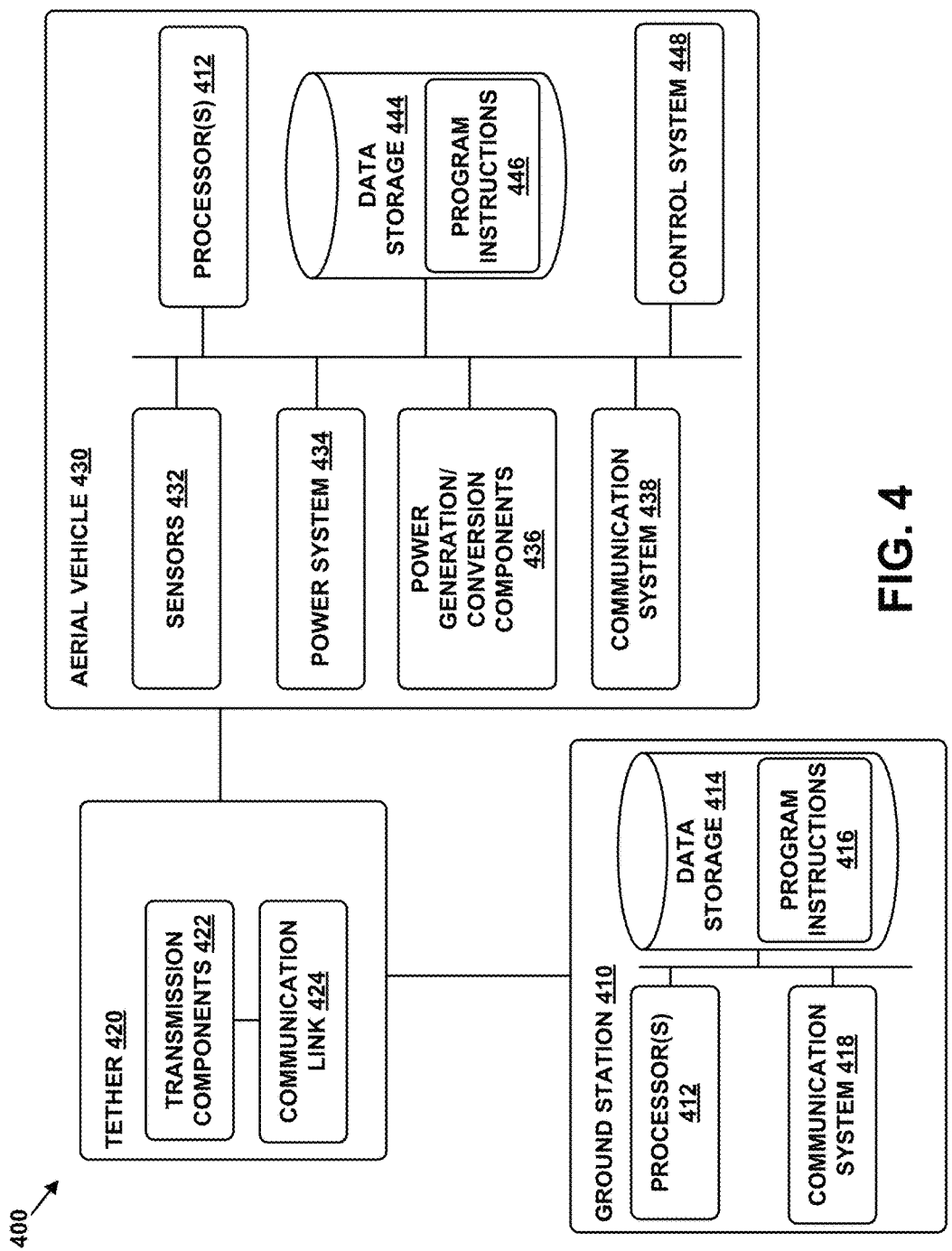
FIG. 4 is a simplified block diagram depicting components of an AWT, according to an example embodiment.

FIG. 4 is a simplified block diagram illustrating components of the AWT 400. The AWT 400 may take the form of or be similar in form to the AWT 400. In particular, the AWT 400 includes a ground station 410, a tether 420, and an aerial vehicle 430. The ground station 410 may take the form of or be similar in form to the ground station 310, the tether 420 may take the form of or be similar in form to the tether 320, and the aerial vehicle 430 may take the form of or be similar in form to the aerial vehicle 330.

As shown in FIG. 4, the ground station 410 may include one or more processors 412, data storage 414, and program instructions 416. A processor 412 may be a general-purpose processor or a special purpose processor (e.g., digital signal processors, application specific integrated circuits, etc.). The one or more processors 412 can be configured to execute computer-readable program instructions 416 that are stored in a data storage 414 and are executable to provide at least part of the functionality described herein.

The data storage 414 may include or take the form of one or more computer-readable storage media that may be read or accessed by at least one processor 412. The one or more computer-readable storage media can include volatile and/or non-volatile storage components, such as optical, magnetic, organic or other memory or disc storage, which may be integrated in whole or in part with at least one of the one or more processors 412. In some embodiments, the data storage 414 may be implemented using a single physical device (e.g., one optical, magnetic, organic or other memory or disc storage unit), while in other embodiments, the data storage 414 can be implemented using two or more physical devices.

As noted, the data storage 414 may include computer-readable program instructions 416 and perhaps additional data, such as diagnostic data of the ground station 410. As such, the data storage 414 may include program instructions to perform or facilitate some or all of the functionality described herein.

In a further respect, the ground station 410 may include a communication system 418. The communications system 418 may include one or more wireless interfaces and/or one or more wireline interfaces, which allow the ground station 410 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 410 may communicate with the aerial vehicle 430, other ground stations, and/or other entities (e.g., a command center) via the communication system 418.

In an example embodiment, the ground station 410 may include communication systems 418 that allows for both short-range communication and long-range communication. For example, the ground station 410 may be configured for short-range communications using Bluetooth and for long-range communications under a CDMA protocol. In such an embodiment, the ground station 410 may be configured to function as a "hot spot"; or in other words, as a gateway or proxy between a remote support device (e.g., the tether 420, the aerial vehicle 430, and other ground stations) and one or more data networks, such as cellular network and/or the Internet. Configured as such, the ground station 410 may facilitate data communications that the remote support device would otherwise be unable to perform by itself.

For example, the ground station 410 may provide a Wi-Fi connection to the remote device, and serve as a proxy or gateway to a cellular service provider's data network, which the ground station 410 might connect to under an LTE or a 3G protocol, for instance. The ground station 410 could also serve as a proxy or gateway to other ground stations or a command station, which the remote device might not be able to otherwise access.

Moreover, as shown in FIG. 4, the tether 420 may include transmission components 422 and a communication link 424. The transmission components 422 may be configured to transmit electrical energy from the aerial vehicle 430 to the ground station 410 and/or transmit electrical energy from the ground station 410 to the aerial vehicle 430. The transmission components 422 may take various different forms in various different embodiments. For example, the transmission components 422 may include one or more conductors that are configured to transmit electricity. And in at least one such example, the one or more conductors may include aluminum and/or any other material which allows for the conduction of electric current. Moreover, in some implementations, the transmission components 422 may surround a core of the tether 420 (not shown).

The ground station 410 could communicate with the aerial vehicle 430 via the communication link 424. The communication link 424 may be bidirectional and may include one or more wired and/or wireless interfaces. Also, there could be one or more routers, switches, and/or other devices or networks making up at least a part of the communication link 424.

Further, as shown in FIG. 4, the aerial vehicle 430 may include one or more sensors 432, a power system 434, power generation/conversion components 436, a communication system 438, one or more processors 442, data storage 444, and program instructions 446, and a control system 448.

The sensors 432 could include various different sensors in various different embodiments. For example, the sensors 432 may include a global a global positioning system (GPS) receiver. The GPS receiver may be configured to provide data that is typical of well-known GPS systems (which may be referred to as a global navigation satellite system (GNNS)), such as the GPS coordinates of the aerial vehicle 430. Such GPS data may be utilized by the AWT 400 to provide various functions described herein.

As another example, the sensors 432 may include one or more wind sensors, such as one or more pitot tubes. The one or more wind sensors may be configured to detect apparent and/or relative wind. Such wind data may be utilized by the AWT 400 to provide various functions described herein.

Still as another example, the sensors 432 may include an inertial measurement unit (IMU). The IMU may include both an accelerometer and a gyroscope, which may be used together to determine the orientation of the aerial vehicle 430. In particular, the accelerometer can measure the orientation of the aerial vehicle 430 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 430, slight errors in measurement may compound over time and result in a more significant error. However, an example aerial vehicle 430 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 430 may also include a pressure sensor or barometer, which can be used to determine the altitude of the aerial vehicle 430. Alternatively, other sensors, such as sonic altimeters or radar altimeters, can be used to provide an indication of altitude, which may help to improve the accuracy of and/or prevent drift of the IMU.

As noted, the aerial vehicle 430 may include the power system 434. The power system 434 could take various different forms in various different embodiments. For example, the power system 434 may include one or more batteries for providing power to the aerial vehicle 430. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 434 may include one or more motors or engines for providing power to the aerial vehicle 430. In some implementations, the one or more motors or engines may be powered by a fuel, such as a hydrocarbon-based fuel. And in such implementations, the fuel could be stored on the aerial vehicle 430 and delivered to the one or more motors or engines via one or more fluid conduits, such as piping. In some implementations, the power system 434 may be implemented in whole or in part on the ground station 410.

As noted, the aerial vehicle 430 may include the power generation/conversion components 436. The power generation/conversion components 426 could take various different forms in various different embodiments. For example, the power generation/conversion components 436 may include one or more generators, such as high-speed, direct-drive generators. With this arrangement, the one or more generators may be driven by one or more rotors, such as the rotors 334A-D. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 430 may include a communication system 438. The communication system 438 may take the form of or be similar in form to the communication system 418. The aerial vehicle 430 may communicate with the ground station 410, other aerial vehicles, and/or other entities (e.g., a command center) via the communication system 438.

In some implementations, the aerial vehicle 430 may be configured to function as a "hot spot"; or in other words, as a gateway or proxy between a remote support device (e.g., the ground station 410, the tether 420, other aerial vehicles) and one or more data networks, such as cellular network and/or the Internet. Configured as such, the aerial vehicle 430 may facilitate data communications that the remote support device would otherwise be unable to perform by itself.

For example, the aerial vehicle 430 may provide a WiFi connection to the remote device, and serve as a proxy or gateway to a cellular service provider's data network, which the aerial vehicle 430 might connect to under an LTE or a 3G protocol, for instance. The aerial vehicle 430 could also serve as a proxy or gateway to other aerial vehicles or a command station, which the remote device might not be able to otherwise access.

As noted, the aerial vehicle 430 may include the one or more processors 442, the program instructions 444, and the data storage 446. The one or more processors 442 can be configured to execute computer-readable program instructions 446 that are stored in the data storage 444 and are executable to provide at least part of the functionality described herein. The one or more processors 442 may take the form of or be similar in form to the one or more processors 412, the data storage 444 may take the form of or be similar in form to the data storage 414, and the program instructions 446 may take the form of or be similar in form to the program instructions 416.

Moreover, as noted, the aerial vehicle 430 may include the control system 448. In some implementations, the control system 448 may be configured to perform one or more functions described herein. The control system 448 may be implemented with mechanical systems and/or with hardware, firmware, and/or software. As one example, the control system 448 may take the form of program instructions stored on a non-transitory computer readable medium and a processor that executes the instructions. The control system 448 may be implemented in whole or in part on the aerial vehicle 430 and/or at least one entity remotely located from the aerial vehicle 430, such as the ground station 410. Generally, the manner in which the control system 448 is implemented may vary, depending upon the particular application.

III. EXAMPLE MOTOR SYSTEMS

Figure 5:
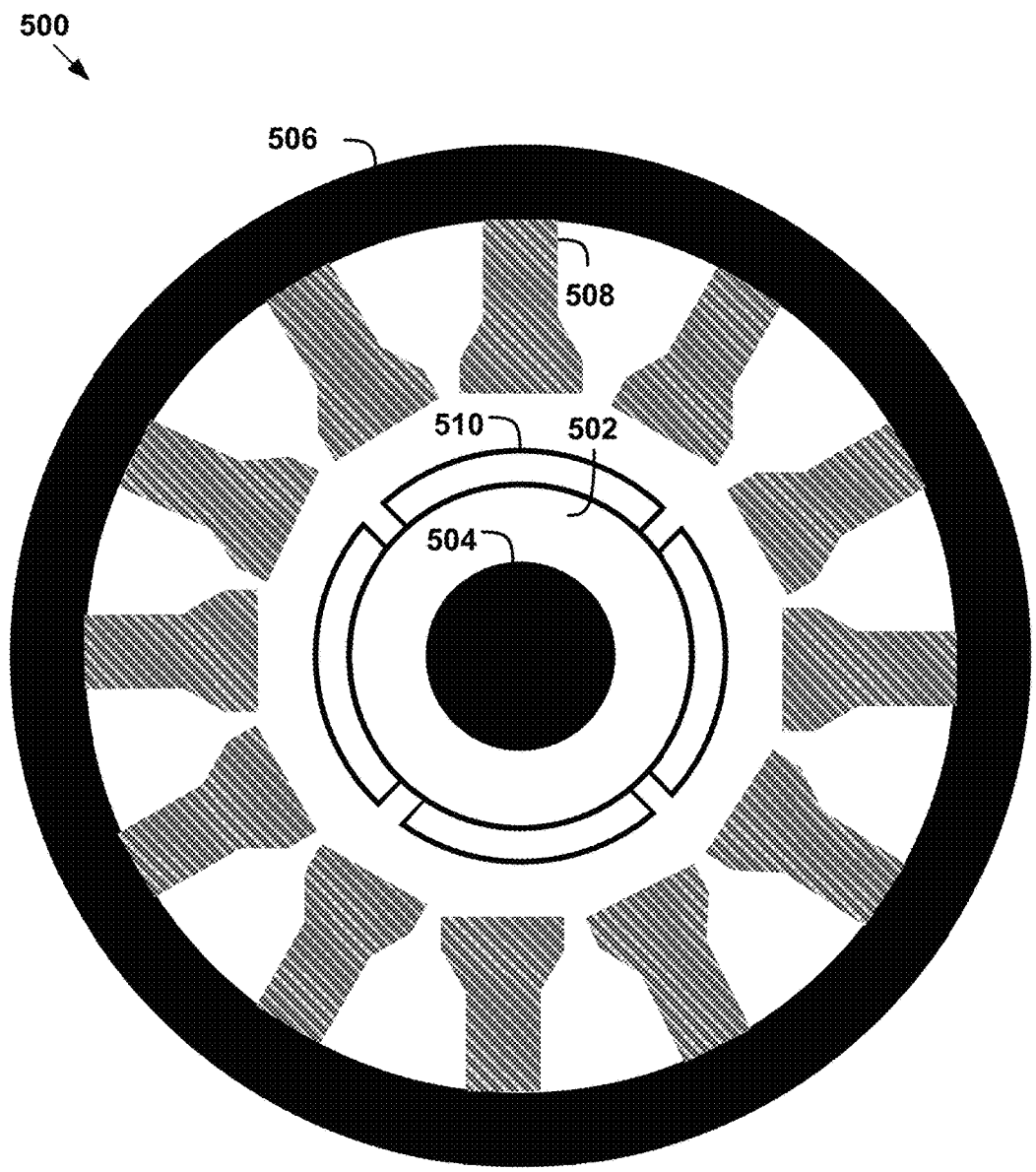
FIG. 5 illustrates a cross-section view of a rotor/stator assembly, according to an example embodiment.

FIG. 5 is a cross-section view illustrating a rotor/stator assembly 500, according to an example embodiment. The rotor/stator assembly 500 may be designed for use in an aerial vehicle of an AWT, such as the aerial vehicle 330 illustrated in FIG. 3. In particular, the rotor/stator assembly 500 may be integrated with a power system in the aerial vehicle, such as the power system 434 described above in connection with FIG. 4. In another embodiment, the rotor/stator assembly 500 may be a component of a standalone motor system.

The rotor/stator assembly 500 may act as both a motor and an electrical generator. To this end, the rotor/stator assembly 500 may be configured to operate in each of a flight mode and a power generation mode. In the flight mode, the rotor/stator assembly 500 may act as a motor, while in the power generation mode the rotor/stator assembly 500 may act as an electrical generator. FIG. 5 illustrates a radial flux machine, but it should be noted that all of the same concepts discussed herein can be applied to other rotor/stator assemblies as well. For example, the rotor/stator assembly may take one or more of an axial flux design, an outrunner design, and/or an inrunner design. Other designs are possible as well.

As shown, the rotor/stator assembly 500 may include a rotor 502, a rotor shaft 504, a stator 506, stator teeth 508, and permanent magnets 510. The stator 506 may define a plurality of sections, and each of the plurality of sections of the stator 506 may include a plurality of teeth. The stator teeth 508 may include a plurality of winding wires wound around the plurality of teeth of the stator 506. The plurality of winding wires wound around the plurality of teeth may define a plurality of single-phase sub-motors, as discussed in more detail in relation to FIG. 6. Each winding wire may have a given number of turns around the plurality of teeth of the stator 506. Further, the space between the stator teeth 508 may be referenced herein as slots, or motor slots.

As shown, the rotor 502 may be disposed coaxial to the stator 506, and the rotor 502 may be configured to rotate relative to the stator 506. In the flight mode, in which the rotor/stator assembly 500 functions as a motor, the stator 506 may be configured to cause the rotor 502 to rotate relative to the stator 506 in response to an input of electrical energy to the stator 506. The rotor 502 may be coupled to the rotor shaft 504, as shown, and the rotor shaft 504 may in turn be coupled to a propeller (not shown). Accordingly, when the rotor 502 rotates relative to the stator 506, the propeller may rotate as well.

In the power generation mode, in which the rotor/stator assembly 500 functions as an electric generator, the stator 506 may be configured to generate electrical energy in response to rotation of the rotor 502 relative to the stator 506. The rotation of the rotor 502 may result from wind energy acting on the propeller, for example. The electrical energy generated by the stator 506 may be transmitted to a ground station in the AWT system via a tether (e.g., an electrically conductive tether) connected to the ground station, as described above.

The motor system 200 shown in FIG. 2 could be realized by driving discrete motor/inverters on the same propeller shaft, but could also be implemented within a single structure by segmenting a motor stator into (m) sub-sections.

These segmented sections of the motor stator may represent sub-motors of the motor system. Since such sub-motors share a common axle, they can be implemented as single phase motors if they are evenly spread in angle over an electrical cycle. As such, an example motor configuration for an example AWT system may include m single phase sub-motors, coupled to m single-phase inverters, connected in series and connected to the tether. Each sub-motor may share a common axle with the propeller, and the (m) sub-motors may be separated by 1/m of an electrical cycle. In such an example, the stator may include m sections that are wound with winding wire, and each section is driven by independent electronics. In this way, the motor configuration operates as a m-phase motor with individually controllable windings. Such a configuration may have various benefits over the motor systems illustrated in FIGS. 1-2, as discussed in additional detail below.

Figure 6:
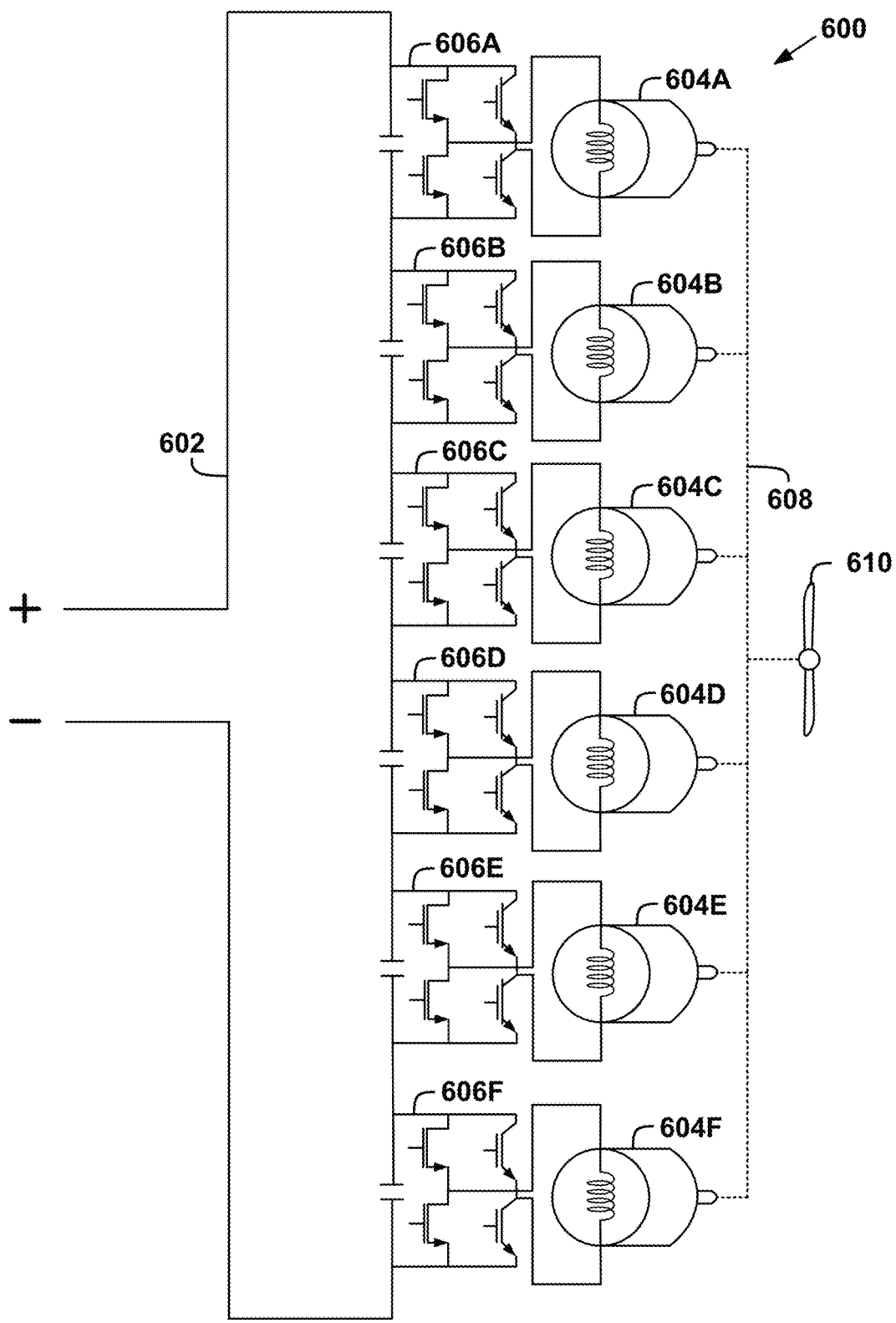
FIG. 6 illustrates a motor system, according to an example embodiment.

FIG. 6 illustrates a motor system 600, according to an example embodiment. The motor system 600 may be designed for use in an aerial vehicle of an AWT, such as the aerial vehicle 330 illustrated in FIG. 3. For example, the motor system 600 may be integrated with a power system in the aerial vehicle, such as the power system 434 described above in connection with FIG. 4.

As shown in FIG. 6, the motor system 600 includes six motor/inverter pairs. Each motor/inverter pair may be implemented within a common magnetic structure, for example, a segmented motor stator with six sections. In such an example, each of the motors may be referred to as a sub-motor. In an example where motors 604A-604F share a common magnetic structure and a common rotor shaft 608, they can be implemented as single phase motors with each motor having a relative phase offset compared to another motor. As shown in FIG. 6, the motors (or sub-motors) 604A-604F are series stacked and connected to a tether 602. Although FIG. 6 illustrates six single-phase sub-motors 604A-604F, other numbers of sub-motors are possible as well. The sub-motors 604A-604F may be 750V 15 kW single-phase sub-motors, although other examples are possible as well. In addition, the motor system 600 may include a rotor and a stator (not shown), such as the rotor/stator system 500 discussed above in relation to FIG. 5. As discussed above in relation to FIG. 5, the stator may define a plurality of sections, where each section of the stator includes a plurality of teeth. The motor system 600 may further include a plurality of winding wires wound around the plurality of teeth of each of the plurality of sections of the stator. In one example, the wire may be an insulated copper wire. In another example, the wire may be an insulated aluminum wire. Other types of wire are possible as well.

The plurality of winding wires wound around the plurality of teeth may define a plurality of single-phase sub-motors. In the example illustrated in FIG. 6, for example, the stator may include six sections, and winding wire may be wound around each of the six sections of the stator to define six single-phase sub-motors 604A-604F. At least one of the plurality of single-phase sub-motors 604A-604F may be offset in angle or phase from an adjacent single-phase sub-motor. Preferably, each of the single-phase sub-motors shown in FIG. 6 may be one-sixth of an electrical cycle shifted from an adjacent single-phase sub-motor. For instance, sub-motor 604A may be one-sixth of an electrical phase shifted from sub-motor 604B and sub-motor 604B may be one-sixth of an electrical phase shifted from sub-motor 604C, etc. As such, each of the sub-motors 604A-604F may be separated by 60 electrical degrees around the stator. In addition, each of the single-phase sub-motors 604A-604F may be coupled to an inverter 606A-606F via the winding wires. The motor system 600 may further include a rotor shaft 608 disposed coaxial to the rotor and coaxial to each of the six single-phase sub-motors 604A-604F, and a propeller 610 coupled to the rotor shaft.

The motor system 600 shown in FIG. 6 may further include a plurality of controllers, according to an example embodiment. In such an example, a given controller of the plurality of controllers may be coupled to each of the plurality of single-phase sub-motors 604A-604F and/or the plurality of inverters 606A-606F such that each of the plurality of controllers may be configured to individually control a given sub-motor of the plurality of sub-motors 604A-604F. In embodiments where a motor system is included in the aerial vehicle, the controllers may similarly be included in the aerial vehicle. For example, the controllers may be similar to the control system 448 described above in connection with FIG. 4. Alternatively or additionally, in embodiments where a motor system is included in the ground station, the controllers may be included in the ground station. Still alternatively or additionally, in embodiments where the motor system is included in aerial vehicle, the controllers may be included in the ground station, or vice versa. Still alternatively or additionally, in embodiments where a motor system is included in each of the aerial vehicle and the ground station, some of the controllers may be included in the aerial vehicle, while other controllers are included in the ground station.

The plurality of controllers may cause the motor system 600 to operate in at least two modes. First, the motor system 600 may be configured to operate in a flight mode, in which the stator may be configured to cause the rotor to rotate relative to the stator in response to an input of electrical energy to the stator from the tether 602. When the rotor rotates, the propeller 610 may rotate as well. As a result, the aerial vehicle may be configured to fly when the rotor/stator assembly operates in the flight mode. Second, the motor system 600 may be configured to operate in a power generation mode, in which the stator may be configured to output electrical energy in response to rotation of the rotor relative to the stator. The rotation of the rotor may result from wind energy acting on the propeller 610. The motor system 600 may transmit the generated electrical energy to the ground station via the tether 602.

Figure 7:
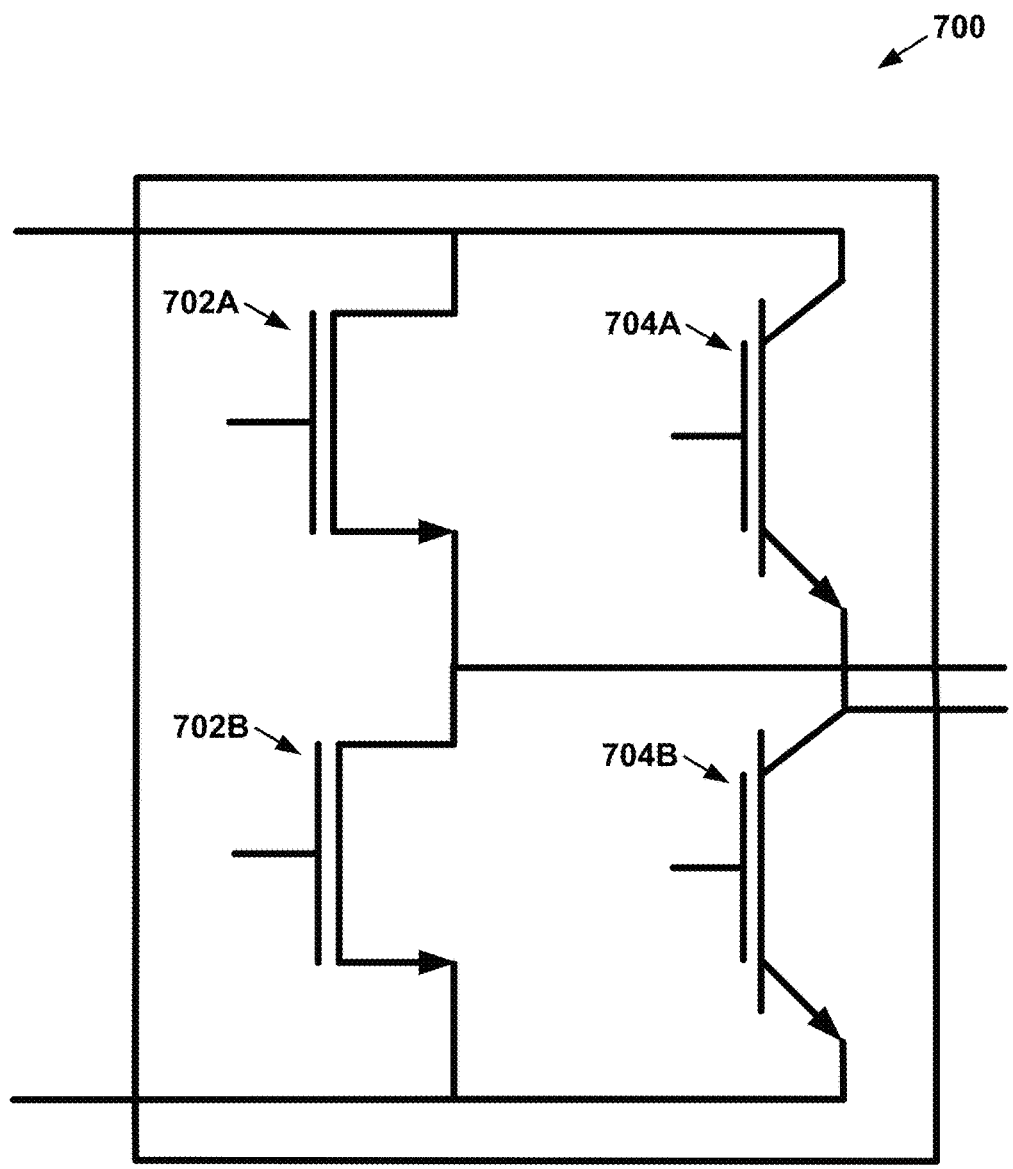
FIG. 7 illustrates an inverter, according to an example embodiment.

FIG. 7 illustrates an inverter 700, according to an example embodiment. The inverter 700 may be representative of the inverters 606A-606F discussed above in relation to FIG. 6. One inverter 700 may be coupled to each of the sub-motors 604A-604F to convert DC power from the tether to alternating current for the sub-motor, or vice-versa. As shown in FIG. 7, the inverter 700 may include four switches 702A, 702B, 704A, and 704B. Two of the switches 702A, 702B may be configured to switch at pulse-width modulation (PWM) frequency. The other two switches 704A, 704B may be configured to switch at twice the motor electrical frequency to invert the polarity of the drive. The use of only two PWM frequency switches (as shown in FIG. 7) is advantageous because slower, lower cost switches can be used for the two slow switches and/or higher efficiency can be achieved for the same PWM switching frequency. Further, for the single phase case there are only four switches necessary compared to six for the three-phase case shown in FIGS. 1 and 2.

The single-phase sub-motor design described above in relation to FIG. 6 provides benefits compared to the three-phase motor designs illustrated in FIGS. 1-2. For example, assuming a constant RMS current density in the motor slot, the single-phase sub-motor design may result in increased torque to mass ratio over a stacked three-phase motor design. In addition, since the windings of a three-phase motor design are driven in series, for a given bus voltage each phase requires one-half of the turns compared to a single-phase design. However, each phase has a factor of three fewer slots when compared to the single-phase design, resulting in more turns per slot, as well as total turns, by a factor of 3/2. Reducing the number of turns per slot and total turns may be advantageous to reduce cost and complexity of the motor system.

Another advantage of the single-phase implementation illustrated in FIG. 6 is that the phase current waveform is trapezoidal with reasonable rise and fall times (e.g., approximately one sixth of an electrical cycle, for example). In an ideal three-phase design, square wave currents are required, which become harder to approximate at higher electrical frequency due to winding inductance. In addition, the winding inductance is proportional to the number of teeth and the square of the number of turns per tooth, meaning the line-to-line inductance of a three-phase implementation is three-halves of the single-phase design.

In addition, unless lapped windings are considered, a three-phase design with concentrated windings requires a fractional pitch arrangement. As a particular example, consider a seventy-two slot stator made up of six sub-motors. Each sub-motor is allotted twelve slots, with four per phase. In order to get the angle offset between phases required for a three-phase configuration, adjacent phases can be wound in the opposite polarity and offset by sixty electrical degrees (e.g., one-third of a magnet). To gain one-third of a magnet in four stator teeth, the teeth must each span an angular measure equal to eleven-twelfths that of a magnet. For a seventy-two tooth stator, that implies sixty-six poles, which can lead to a further reduction in torque to mass ratio compared to a full-pitch single-phase design.

Figure 8:
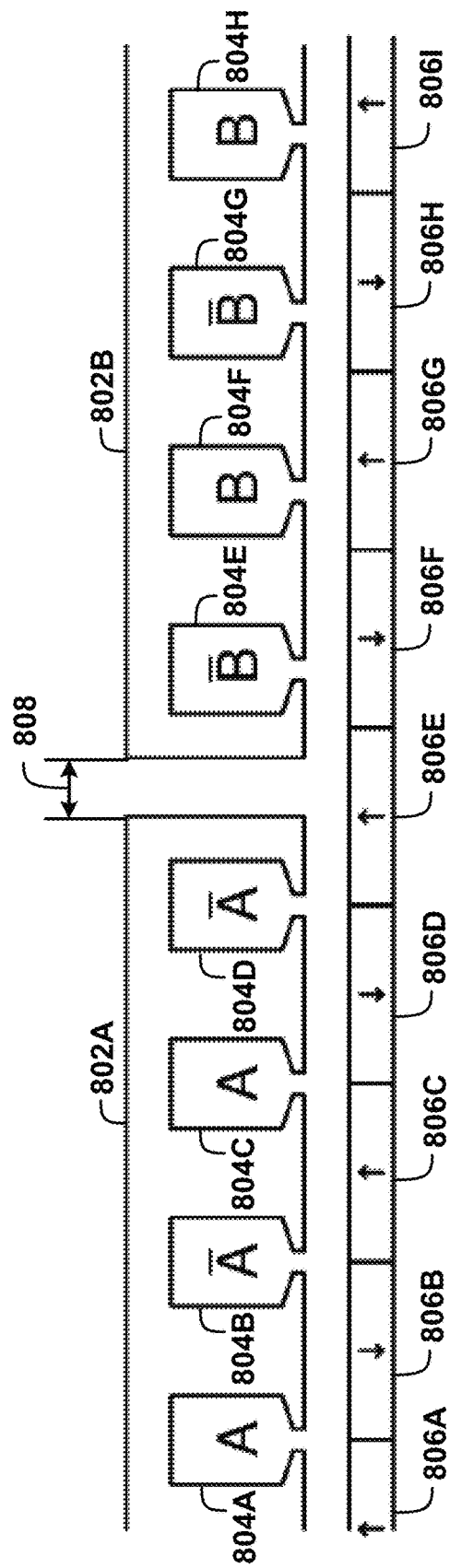
FIG. 8 illustrates an example magnetic design and winding configuration of a motor system, according to an example embodiment.

In contrast, the single-phase design benefits from full-pitch windings for any number of teeth. FIG. 8 illustrates an example magnetic design and winding configuration for an example single-phase sub-motor system. FIG. 8 illustrates an abstraction of a radial flux motor into a linear motor for ease of viewing. In particular, FIG. 8 illustrates two stator sections 802A, 802B. Each stator section includes a plurality of teeth. For example, stator section 802A includes stator teeth 804A-804D, while stator section 802B includes stator teeth 804E-804H. The stator teeth 804A-804H may each include a winding wire wound around teeth, as discussed above. Further, the stator teeth 804A-804H may be positioned adjacent to a plurality of magnets 806A-806I.

In order to achieve the one-sixth electrical angle offset from sub-motor to sub-motor in the single-phase design, the stator section of each sub-motor can be rotationally separated from the next stator section by one-third of a magnet. Such an offset 808 between stator section 802A and stator section 802B is illustrated in FIG. 8. For any number of stator teeth, the configuration illustrated in FIG. 8 would yield exactly two fewer poles than stator teeth (e.g., seventy-two teeth would yield seventy poles). An additional advantage of the configuration illustrated in FIG. 8 is that it allows physical spacing between adjacent sub-motors that may enhance voltage isolation between stack levels. In addition, the single-phase configuration has only two-thirds the number of leads exiting the stator to a controller, which may reduce mechanical complexity of the system.

The bus capacitance in a stacked system is dictated only by the bandwidth of the stacking voltage control loop and high frequency decoupling of the power electronics of the system. With a single-phase configuration, the bus capacitance also must buffer energy at twice the electrical frequency when the single-phase power input or output goes to zero. The same amount of energy can be stored in a smaller capacitor if the full voltage rating is utilized.

Figure 9B:
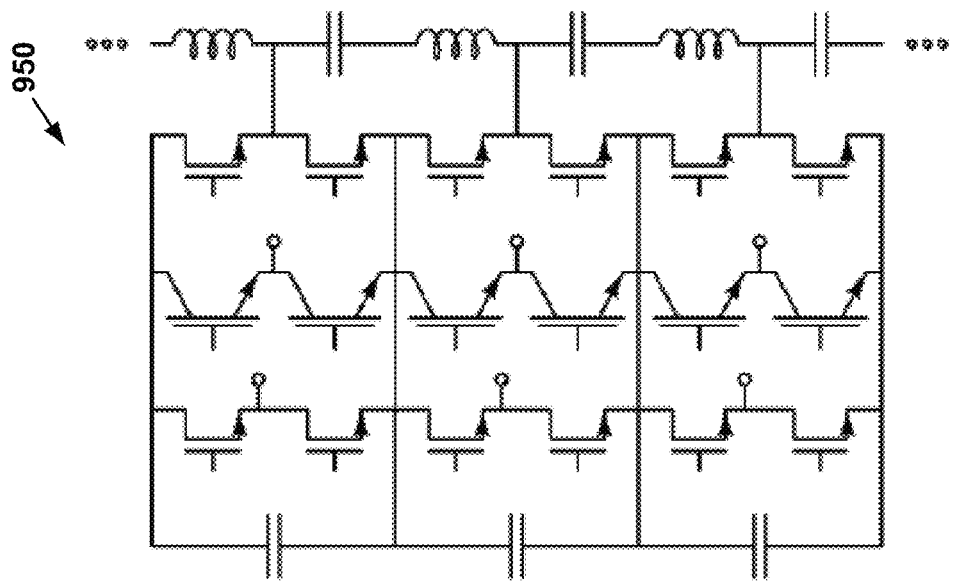
FIG. 9B illustrates a power balancing circuit, according to an example embodiment.
Figure 9A:
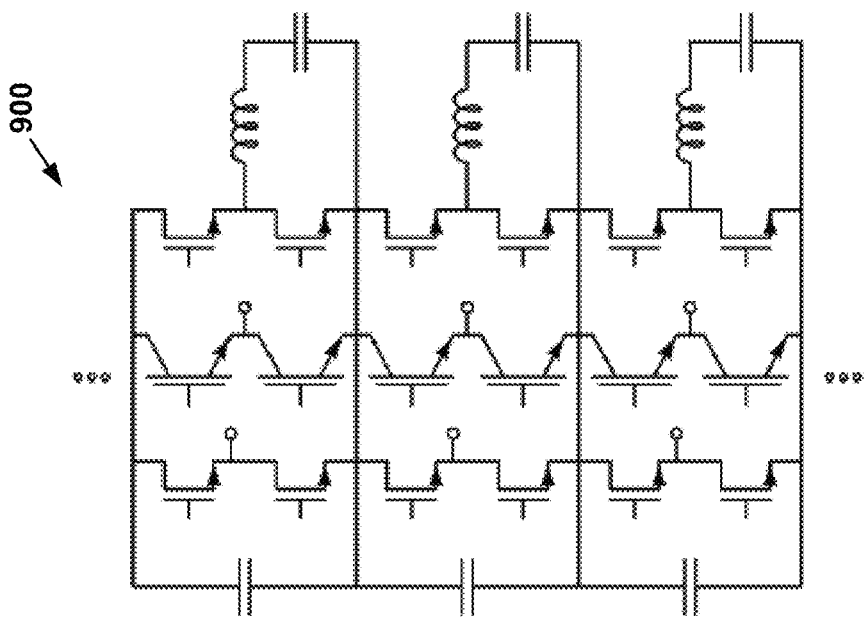
FIG. 9A illustrates an energy buffering flying capacitor circuit, according to an example embodiment.

For example, FIG. 9A illustrates an example energy buffering flying capacitor circuit 900 that may be used in the single-phase design to reduce the bus capacitance requirement. As shown in FIG. 9A, the capacitor circuit 900 includes two extra switches per stack level as compared with the inverter shown in FIG. 7.

In another example, instead of storing energy on a stack level, another way to deal with varying stack level power is to shift the power between stack levels. One way this can be achieved is through a dual active half-bridge circuit with a DC blocking capacitor, as shown in FIG. 9B. Several other approaches of this nature may be possible as well, such as switched capacitors, resonant switched capacitors, and shared magnetic converters, as examples. The particular topology 950 shown in FIG. 9B has the advantage that the switching devices can achieve zero voltage switching, and hence high efficiency at higher powers. Balancers of this nature not only provide the energy sharing necessary at twice the electrical frequency, but also can be used to decouple the stack balancing control from the motor control, thus providing a mechanism to shift power up and down the stack to balance the stack level voltages.

IV. CONCLUSION

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A system comprising:
   a rotor;
   a plurality of magnets positioned adjacent to the rotor;
   a stator defining a plurality of sections, wherein each of the plurality of sections of the stator include a plurality of teeth;
   a plurality of winding wires wound around the plurality of teeth of each of the plurality of sections of the stator, wherein the plurality of winding wires wound around the plurality of teeth define a plurality of single-phase sub-motors, and wherein at least one of the plurality of single-phase sub-motors is rotationally offset from an adjacent single-phase sub-motor; and
   a plurality of inverters coupled to the plurality of winding wires, wherein each of the plurality of inverters comprises four switches, wherein two of the switches are configured to switch at a pulse-width modulation (PWM) frequency, and wherein two of the switches are configured to switch at twice a motor electrical frequency.

2. The system of claim 1, further comprising:
a rotor shaft disposed coaxial to the rotor and coaxial to each of the plurality of single-phase sub-motors; and
a propeller coupled to the rotor shaft.

3. The system of claim 1, wherein the plurality of single-phase sub-motors comprises six single-phase sub-motors.

4. The system of claim 3, wherein a given single-phase sub-motor of the six single-phase sub-motors is phase shifted by one sixth of an electrical cycle from an adjacent single-phase sub-motor.

5. The system of claim 3, wherein each of the plurality of single-phase sub-motors are rotationally offset from an adjacent single-phase sub-motor.

6. The system of claim 1, further comprising a control system including a plurality of controllers, wherein a given controller of the plurality of controllers is coupled to each of the plurality of single-phase sub-motors such that each of the plurality of controllers may be configured to individually control a given sub-motor of the plurality of sub-motors.

7. The system of claim 6, wherein plurality of controllers are configured to cause the system to operate in at least two modes: (i) a flight mode, wherein the stator is configured to cause the rotor to rotate relative to the stator in response to an input of electrical energy to the stator, thereby causing a propeller to rotate, and (ii) a power generation mode, wherein the stator is configured to output electrical energy in response to rotation of the rotor relative to the stator via wind energy acting on the propeller.

8. The system of claim 7, wherein the electrical energy generated in the power generation mode is transmitted to a ground station via a tether.

9. An aerial wind turbine comprising:
a ground station;
an aerial vehicle;
a rotor/stator assembly comprising:
  a rotor,
  a rotor shaft,
  a plurality of magnets positioned adjacent to the rotor;
  a stator defining a plurality of sections, wherein each of the plurality of sections of the stator include a plurality of teeth, wherein the stator is disposed coaxial to the rotor, and wherein the rotor is configured to rotate relative to the stator,
  a plurality of winding wires wound around the plurality of teeth of each of the plurality of sections of the stator, wherein the plurality of winding wires wound around the plurality of teeth define a plurality of single-phase sub-motors, and wherein at least one of the plurality of single-phase sub-motors is rotationally offset from an adjacent single-phase sub-motor, and
  a plurality of inverters coupled to the plurality of winding wires, wherein each of the plurality of inverters comprises four switches, wherein two of the switches are configured to switch at a pulse-width modulation (PWM) frequency, and wherein two of the switches are configured to switch at twice a motor electrical frequency;
a propeller coupled to the rotor shaft; and
an electrically conductive tether coupled to the stator and to the ground station.

10. The aerial wind turbine of claim 9, wherein the rotor/stator assembly is configured for at least two modes of operation: (i) a flight mode, wherein the stator is configured to cause the rotor to rotate relative to the stator in response to an input of electrical energy to the stator from the tether, thereby causing the propeller to rotate, and (ii) a power generation mode, wherein the stator is configured to output electrical energy in response to rotation of the rotor relative to the stator via wind energy acting on the propeller, and wherein the generated electrical energy is transmitted to the ground station via the tether.

11. The aerial wind turbine of claim 9, wherein the plurality of single-phase sub-motors comprises six single-phase sub-motors.

12. The aerial wind turbine of claim 11, wherein a given single-phase sub-motor of the six single-phase sub-motors is phase shifted by one sixth of an electrical cycle from an adjacent single-phase sub-motor.

13. A system comprising:
a motor system comprising (i) a rotor, (ii) a plurality of magnets positioned adjacent to the rotor; (iii) a stator defining a plurality of sections, wherein each of the plurality of sections of the stator include a plurality of teeth, (iv) a plurality of winding wires wound around the plurality of teeth of each of the plurality of sections of the stator, wherein the plurality of winding wires wound around the plurality of teeth define a plurality of single-phase sub-motors, and wherein at least one of the plurality of single-phase sub-motors is rotationally offset from an adjacent single-phase sub-motor, and (v) a plurality of inverters coupled to the plurality of winding wires, wherein each of the plurality of inverters comprises four switches, wherein two of the switches are configured to switch at a pulse-width modulation (PWM) frequency, and wherein two of the switches are configured to switch at twice a motor electrical frequency; and
a control system comprising a plurality of controllers, wherein a given controller of the plurality of controllers is coupled to each of the plurality of single-phase sub-motors such that each of the plurality of controllers may be configured to individually control a given sub-motor of the plurality of sub-motors.

14. The system of claim 13, wherein the plurality of single-phase sub-motors comprises six single-phase sub-motors.

15. The system of claim 13, wherein the control system is configured to cause the system to operate in at least two modes: (i) a flight mode, wherein the stator is configured to cause the rotor to rotate relative to the stator in response to an input of electrical energy to the stator, thereby causing a propeller to rotate, and (ii) a power generation mode, wherein the stator is configured to output electrical energy in response to rotation of the rotor relative to the stator via wind energy acting on the propeller.

* * * * *